United States Patent
Lee et al.

(10) Patent No.: US 10,789,634 B2
(45) Date of Patent: Sep. 29, 2020

(54) PERSONALIZED RECOMMENDATION METHOD AND SYSTEM, AND COMPUTER-READABLE RECORD MEDIUM

(71) Applicant: LG CNS CO., LTD., Seoul (KR)

(72) Inventors: Hwan Muk Lee, Seoul (KR); Dae Sik Lee, Seoul (KR); Byung Keug Kim, Seoul (KR); Soo Min Kim, Seoul (KR); Min Yong Park, Seoul (KR); Han Yi Song, Seoul (KR); Dong Yoon Lee, Seoul (KR); Yoon Jae Lee, Seoul (KR)

(73) Assignee: LG CNS Co., Ltd., Seoul (KR)

( * ) Notice: Subject to any disclaimer, the term of this patent is extended or adjusted under 35 U.S.C. 154(b) by 863 days.

(21) Appl. No.: 14/563,676

(22) Filed: Dec. 8, 2014

(65) Prior Publication Data

US 2016/0162974 A1     Jun. 9, 2016

(51) Int. Cl.
*G06Q 30/06* (2012.01)

(52) U.S. Cl.
CPC ............................... *G06Q 30/0631* (2013.01)

(58) Field of Classification Search
CPC .................................................. G06Q 30/0631
USPC ......................................................... 705/26.7
See application file for complete search history.

(56) References Cited

U.S. PATENT DOCUMENTS

| | | | | |
|---|---|---|---|---|
| 2009/0006398 A1* | 1/2009 | Lam | ........................ | G06Q 30/02 |
| 2011/0035388 A1* | 2/2011 | Im | ........................ | G06Q 30/02 707/754 |
| 2012/0023045 A1* | 1/2012 | Steck | ..................... | G06N 20/00 706/12 |

OTHER PUBLICATIONS

Liu, C., Sun, C. and Fang, M., The Design of an Open Hybrid Recommendation System for Mobile Commerce, 2008, 2008 11th IEEE International Conference on Communication Technology, Hangzhou, doi: 10.1109/ICCT.2008.4716147, pp. 129-134. (Year: 2008).*

* cited by examiner

*Primary Examiner* — Jason B Dunham
*Assistant Examiner* — Brittany E Bargeon
(74) *Attorney, Agent, or Firm* — KED & Associates LLP

(57) ABSTRACT

Provided is a method, system, and a computer-readable record medium for providing a personalized recommendation of products. The method of providing a personalized recommendation of products may include obtaining a first recommendation result using each of two or more single recommendation algorithms, performing a first performance evaluation, using a processor, with respect to the first recommendation result from each of the single recommendation algorithms, obtaining a second recommendation result based on the first recommendation result from each of the two or more single recommendation algorithms using a hybrid recommendation algorithm, the hybrid recommendation algorithms being different than each of the two or more single recommendation algorithms, performing a second performance evaluation, using the processor, with respect to the second recommendation result from the hybrid recommendation algorithm, and listing product recommendations after selecting a recommendation algorithm having a priority using the first performance evaluation and the second performance evaluation.

7 Claims, 6 Drawing Sheets

FIG. 3

FIRST RECOMMENDATION RESULT

| SINGLE RECOMMENDATION ALGORITHM | CUSTOMER | FIRST RECOMMENDATION PRODUCT | FIRST RECOMMENDATION RANKING |
|---|---|---|---|
| COLLABORATIVE FILTERING (CF) | C1 | A | 1 |
| COLLABORATIVE FILTERING (CF) | C1 | D | 2 |
| COLLABORATIVE FILTERING (CF) | C1 | C | 3 |
| COLLABORATIVE FILTERING (CF) | C1 | E | 4 |
| COLLABORATIVE FILTERING (CF) | C1 | B | 5 |

FIRST VERIFYING RESULT

| SINGLE RECOMMENDATION ALGORITHM | CUSTOMER | FIRST RECOMMENDATION PRODUCT | FIRST RECOMMENDATION RANKING |
|---|---|---|---|
| COLLABORATIVE FILTERING (CF) | C1 | D | 1 |
| COLLABORATIVE FILTERING (CF) | C1 | E | 2 |
| COLLABORATIVE FILTERING (CF) | C1 | A | 3 |
| COLLABORATIVE FILTERING (CF) | C1 | E | 4 |
| COLLABORATIVE FILTERING (CF) | C1 | B | 5 |

(a)

FIRST RECOMMENDATION RESULT

| SINGLE RECOMMENDATION ALGORITHM | CUSTOMER | FIRST RECOMMENDATION PRODUCT | FIRST RECOMMENDATION RANKING |
|---|---|---|---|
| ASSOCIATION RULE (AR) | C1 | B | 1 |
| ASSOCIATION RULE (AR) | C1 | D | 2 |
| ASSOCIATION RULE (AR) | C1 | A | 3 |
| ASSOCIATION RULE (AR) | C1 | E | 4 |
| ASSOCIATION RULE (AR) | C1 | F | 5 |

FIRST VERIFYING RESULT

| SINGLE RECOMMENDATION ALGORITHM | CUSTOMER | FIRST RECOMMENDATION PRODUCT | FIRST RECOMMENDATION RANKING |
|---|---|---|---|
| ASSOCIATION RULE (AR) | C1 | D | 1 |
| ASSOCIATION RULE (AR) | C1 | E | 2 |
| ASSOCIATION RULE (AR) | C1 | A | 3 |
| ASSOCIATION RULE (AR) | C1 | C | 4 |
| ASSOCIATION RULE (AR) | C1 | B | 5 |

(b)

FIRST RECOMMENDATION RESULT

| SINGLE RECOMMENDATION ALGORITHM | CUSTOMER | FIRST RECOMMENDATION PRODUCT | FIRST RECOMMENDATION RANKING |
|---|---|---|---|
| PURCHASE PATTERN (PP) PRODUCT RECOMMENDATION | C1 | C | 1 |
| PURCHASE PATTERN (PP) PRODUCT RECOMMENDATION | C1 | E | 2 |
| PURCHASE PATTERN (PP) PRODUCT RECOMMENDATION | C1 | W | 3 |
| PURCHASE PATTERN (PP) PRODUCT RECOMMENDATION | C1 | B | 4 |
| PURCHASE PATTERN (PP) PRODUCT RECOMMENDATION | C1 | S | 5 |

FIRST VERIFYING RESULT

| SINGLE RECOMMENDATION ALGORITHM | CUSTOMER | FIRST RECOMMENDATION PRODUCT | FIRST RECOMMENDATION RANKING |
|---|---|---|---|
| PURCHASE PATTERN (PP) PRODUCT RECOMMENDATION | C1 | C | 1 |
| PURCHASE PATTERN (PP) PRODUCT RECOMMENDATION | C1 | E | 2 |
| PURCHASE PATTERN (PP) PRODUCT RECOMMENDATION | C1 | W | 3 |
| PURCHASE PATTERN (PP) PRODUCT RECOMMENDATION | C1 | J | 4 |
| PURCHASE PATTERN (PP) PRODUCT RECOMMENDATION | C1 | A | 5 |

| HYBRID RECOMMENDATION ALGORITHM | CUSTOMER | FIRST RECOMMENDATION PRODUCT | FIRST RECOMMENDTION RANKING |
|---|---|---|---|
| COLLABORATIVE FILTERING (CF) | C1 | A | 1 |
| COLLABORATIVE FILTERING (CF) | C1 | D | 2 |
| COLLABORATIVE FILTERING (CF) | C1 | C | 3 |
| COLLABORATIVE FILTERING (CF) | C1 | E | 4 |
| COLLABORATIVE FILTERING (CF) | C1 | B | 5 |
| ASSOCIATION RULE (AR) | C1 | B | 1 |
| ASSOCIATION RULE (AR) | C1 | D | 2 |
| ASSOCIATION RULE (AR) | C1 | A | 3 |
| ASSOCIATION RULE (AR) | C1 | E | 4 |
| ASSOCIATION RULE (AR) | C1 | F | 5 |
| PURCHASE PATTERN (PP) PRODUCT RECOMMENDATION | C1 | C | 1 |
| PURCHASE PATTERN (PP) PRODUCT RECOMMENDATION | C1 | E | 2 |
| PURCHASE PATTERN (PP) PRODUCT RECOMMENDATION | C1 | W | 3 |
| PURCHASE PATTERN (PP) PRODUCT RECOMMENDATION | C1 | B | 4 |
| PURCHASE PATTERN (PP) PRODUCT RECOMMENDATION | C1 | S | 5 |

FIG. 5

| PRODUCT | SALES RATE | SALES RANKING |
|---|---|---|
| A | 17.6% | 2 |
| B | 8.8% | 5 |
| C | 11.4% | 4 |
| D | 24.3% | 1 |
| E | 16.5% | 3 |
| ○○○○ | ○○○○ | ○○○○ |

FIG. 6

| ALGORITHM | PERFORMANCE EVALUATION RESULT (PRIORITY) |
|---|---|
| HYBRID RECOMMENDATION ALGORITHM | 1 |
| PURCHASE PATTERN (PP) PRODUCT RECOMMENDATION | 2 |
| COLLABORATIVE FILTERING (CF) | 3 |
| ASSOCIATION RULE (AR) | 4 |

(a)

| ALGORITHM | CUSTOMER | RECOMMENDATION PRODUCT | RECOMMENDATION RANKING | PRIORITY |
|---|---|---|---|---|
| HYBRID RECOMMENDATION ALGORITHM | C1 | D | 1 | 1 |
| HYBRID RECOMMENDATION ALGORITHM | C1 | E | 2 | 1 |
| HYBRID RECOMMENDATION ALGORITHM | C1 | A | 3 | 1 |
| HYBRID RECOMMENDATION ALGORITHM | C1 | C | 4 | 1 |
| HYBRID RECOMMENDATION ALGORITHM | C1 | B | 5 | 1 |
| PURCHASE PATTERN (PP) PRODUCT RECOMMENDATION | C1 | C | 1 | 2 |
| PURCHASE PATTERN (PP) PRODUCT RECOMMENDATION | C1 | E | 2 | 2 |
| PURCHASE PATTERN (PP) PRODUCT RECOMMENDATION | C1 | W | 3 | 2 |
| PURCHASE PATTERN (PP) PRODUCT RECOMMENDATION | C1 | B | 4 | 2 |
| PURCHASE PATTERN (PP) PRODUCT RECOMMENDATION | C1 | S | 5 | 2 |
| COLLABORATIVE FILTERING (CF) | C1 | A | 1 | 3 |
| COLLABORATIVE FILTERING (CF) | C1 | D | 2 | 3 |
| COLLABORATIVE FILTERING (CF) | C1 | C | 3 | 3 |
| COLLABORATIVE FILTERING (CF) | C1 | E | 4 | 3 |
| COLLABORATIVE FILTERING (CF) | C1 | B | 5 | 3 |
| ASSOCIATION RULE (AR) | C1 | B | 1 | 4 |
| ASSOCIATION RULE (AR) | C1 | D | 2 | 4 |
| ASSOCIATION RULE (AR) | C1 | A | 3 | 4 |
| ASSOCIATION RULE (AR) | C1 | E | 4 | 4 |
| ASSOCIATION RULE (AR) | C1 | F | 5 | 4 |

(b)

| ALGORITHM | CUSTOMER | RECOMMENDATION PRODUCT | RECOMMENDATION RANKING | PRIORITY |
|---|---|---|---|---|
| HYBRID RECOMMENDATION ALGORITHM | C1 | D | 1 | 1 |
| HYBRID RECOMMENDATION ALGORITHM | C1 | E | 2 | 1 |
| HYBRID RECOMMENDATION ALGORITHM | C1 | A | 3 | 1 |
| HYBRID RECOMMENDATION ALGORITHM | C1 | C | 4 | 1 |
| HYBRID RECOMMENDATION ALGORITHM | C1 | B | 5 | 1 |
| PURCHASE PATTERN (PP) PRODUCT RECOMMENDATION | C1 | C | 1 | 2 |
| PURCHASE PATTERN (PP) PRODUCT RECOMMENDATION | C1 | E | 2 | 2 |
| PURCHASE PATTERN (PP) PRODUCT RECOMMENDATION | C1 | W | 3 | 2 |
| PURCHASE PATTERN (PP) PRODUCT RECOMMENDATION | C1 | B | 4 | 2 |
| PURCHASE PATTERN (PP) PRODUCT RECOMMENDATION | C1 | S | 5 | 2 |
| COLLABORATIVE FILTERING (CF) | C1 | A | 1 | 3 |
| COLLABORATIVE FILTERING (CF) | C1 | D | 2 | 3 |
| COLLABORATIVE FILTERING (CF) | C1 | C | 3 | 3 |
| COLLABORATIVE FILTERING (CF) | C1 | E | 4 | 3 |
| COLLABORATIVE FILTERING (CF) | C1 | B | 5 | 3 |
| ASSOCIATION RULE (AR) | C1 | B | 1 | 4 |
| ASSOCIATION RULE (AR) | C1 | D | 2 | 4 |
| ASSOCIATION RULE (AR) | C1 | A | 3 | 4 |
| ASSOCIATION RULE (AR) | C1 | E | 4 | 4 |
| ASSOCIATION RULE (AR) | C1 | F | 5 | 4 |

| ALGORITHM | CUSTOMER | CUSTOMER RECOMMENDATION PRODUCT | CUSTOMER RECOMMENDTION RANKING |
|---|---|---|---|
| HYBRID RECOMMENDATION ALGORITHM | C1 | D | 1 |
| HYBRID RECOMMENDATION ALGORITHM | C1 | E | 2 |
| HYBRID RECOMMENDATION ALGORITHM | C1 | A | 3 |
| HYBRID RECOMMENDATION ALGORITHM | C1 | C | 4 |
| HYBRID RECOMMENDATION ALGORITHM | C1 | B | 5 |
| PURCHASE PATTERN (PP) PRODUCT RECOMMENDATION | C1 | W | 6 |
| PURCHASE PATTERN (PP) PRODUCT RECOMMENDATION | C1 | S | 7 |
| ASSOCIATION RULE (AR) | C1 | F | 8 |

PERSONALIZED RECOMMENDATION METHOD AND SYSTEM, AND COMPUTER-READABLE RECORD MEDIUM

BACKGROUND

1. Field

The present disclosure relates to a personalized recommendation method and system, and a computer-readable record medium, and more particularly, to a personalized recommendation method and system, and a computer-readable record medium capable of increasing a hit rate of a recommendation product of each customer using performance evaluation of a recommendation algorithm.

2. Background

A product recommendation service is widely being used as a main marketing means in the field of e-commerce.

Generally, when a customer visits an on-line market which is in an Internet or a mobile portal site, the on-line market recommends products in the form of a pop-up on a main window to the customer, or when the customer clicks specific products, the on-line market recommends related products to the customer. At this time, the recommended products may mostly be the most popular products, etc. in the on-line market.

However, since the product recommendation method recommends products en bloc to every customer without considering preference of each customer, there is a problem in that purchase effect of the recommended products is lowered.

Accordingly, the on-line market may provide a product recommendation service of recommending products that a corresponding customer is likely to prefer by analyzing purchase behavior of the corresponding customer, or recommending a product purchased by another customer having a similar purchase behavior with the corresponding customer to the corresponding customer. That is, the product recommendation service is being changed to recommend a product that the customer may need by considering needs and preferences of each customer.

An algorithm which is representatively used as the product recommendation service is a collaborative filtering (CF) algorithm. The CF algorithm is a service of mutually recommending to customers having similar behaviors by identifying customers having similar preferences and interests based on preference and interest expressions of customers, or recommending a related product according to behaviors or life patterns of classified customers.

However, since the CF algorithm recommends the product on the assumption that the customers having the similar patterns have the same purchase behavior pattern, there is a problem in which the product recommendation for the customer having a different purchase behavior pattern is not performed properly.

BRIEF DESCRIPTION OF THE DRAWINGS

The embodiments will be described in detail with reference to the following drawings in which like reference numerals refer to like elements wherein:

FIG. 3 is a diagram showing a first recommendation result and a first verifying result obtained using a single recommendation algorithm according to an exemplary embodiment of the present disclosure;

FIG. 4 is a diagram showing a second recommendation result obtained using a hybrid recommendation algorithm according to an exemplary embodiment of the present disclosure;

FIG. 5 is a diagram illustrating sales rate rankings according to an exemplary embodiment of the present disclosure;

FIG. 6 is a diagram illustrating a method of selecting a customer recommendation product according to an exemplary embodiment of the present disclosure; and FIG. 7 is a table illustrating a result of a customer recommendation product according to an exemplary embodiment of the present disclosure.

DETAILED DESCRIPTION

Figure 1:
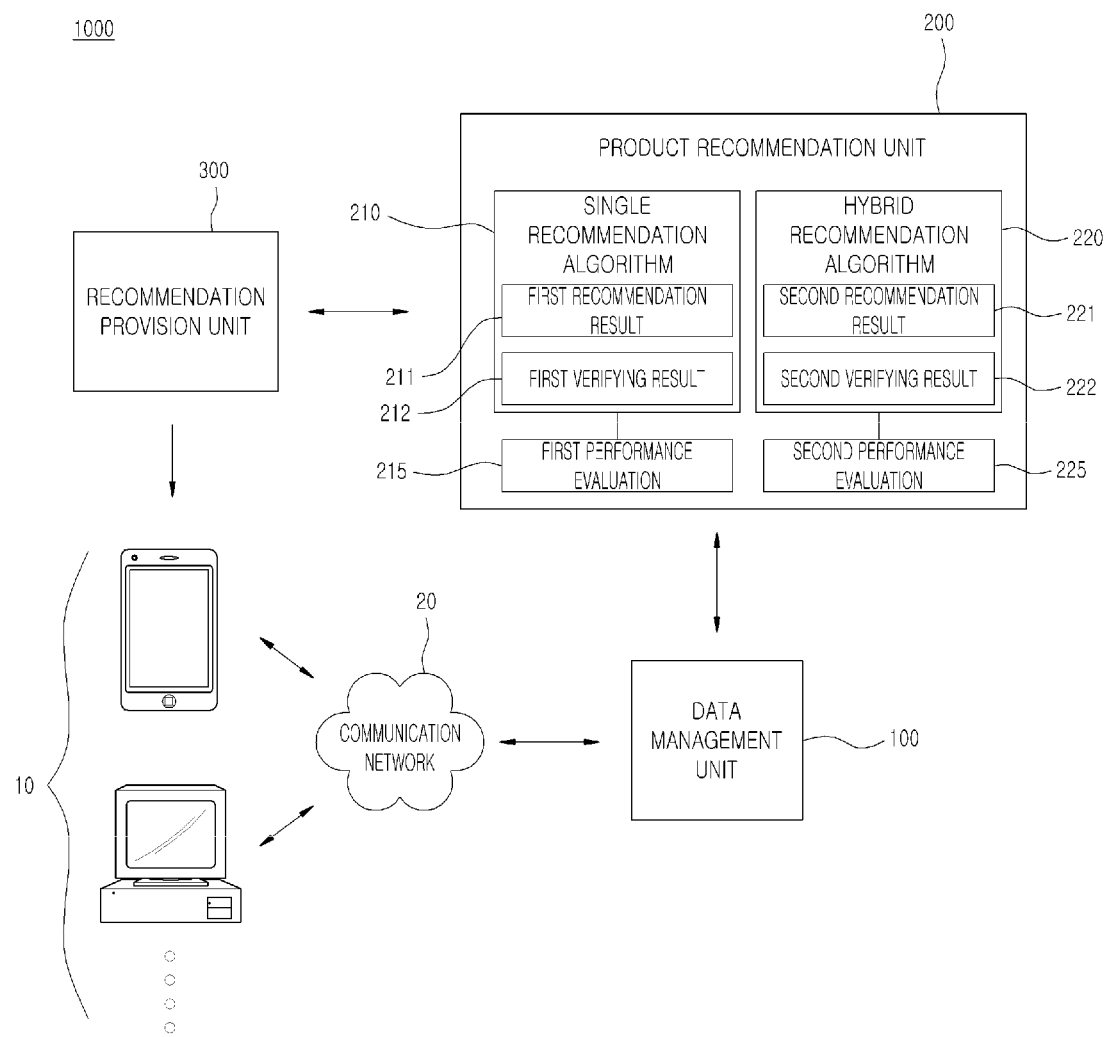
FIG. 1 is a schematic diagram illustrating a personalized recommendation system according to an exemplary embodiment of the present disclosure.

Exemplary embodiments of the present disclosure will be described in detail below with reference to the accompanying drawings. Exemplary embodiments will be described in sufficient detail to enable those of ordinary skill in the art to embody and practice the inventive concept. Exemplary embodiments are different, but it should be understood that they do not need to be mutually exclusive. For example, a particular shape, structure, characteristic set forth herein may be embodied in many alternate forms included in the spirit and the scope of the inventive concept. Further, it should be understood that a position and arrangement of each component, or element included in each embodiment may also be embodied in many alternative forms included in the spirit and the scope of the inventive concept. Accordingly, detailed descriptions which will be described hereinafter is not to be construed as limiting thereof, and all such modifications are intended to be included within the scope of the inventive concept as defined in the claims. When giving reference numerals to components of each drawing, it should be noted that the same or similar reference numeral is given to the same or similar component or function in many ways.

Hereinafter, exemplary embodiments of the present disclosure will be described in detail with reference to the accompanying drawings to enable those of ordinary skill in the art to embody and practice the inventive concept.

FIG. 1 is a schematic diagram illustrating a personalized recommendation system according to an exemplary embodiment of the present disclosure. A personalized recommendation system 1000 may include a data management unit 100, a product recommendation unit 200, and a recommendation provision unit 300.

The data management unit 100 may be connected to a plurality of terminals 10 through a communication network 20. Here, the plurality of terminals 10 may be terminals capable of transmitting and receiving various data through the communication network 20 according to a user's operation, and may be at least one of a tablet personal computer (PC), a laptop computer, a PC, a smart phone, a personal digital assistant (PDA), a smart television (TV), a mobile communication terminal, or the like. Further, the terminal 10 may be a terminal for performing voice or data communication using the communication network 20, and may be a terminal including a memory for storing a browser, a program, and a protocol for communicating with the data management unit 100 through the communication network 20, and a microprocessor for executing various programs and performing calculation and control, etc. For example, the terminal 10 may be any terminal capable of performing server-client communication with the data management unit 100 and executing a broadcasting service, and may mean a broad concept including a communication computing device such as a notebook computer, a mobile communication terminal, a PDA, etc. Meanwhile, the terminal 10 may be preferably manufactured as a device having a touch screen, but is not limited thereto.

The plurality of terminals 10 and the data management unit 100 may be connected through the communication network 20, and the communication network 20 may be a network capable of transmitting and receiving data according to an Internet protocol using various wired or wireless communication technologies such as an Internet network, an Intranet network, a mobile communication network, a satellite communication network, or the like.

Further, the communication network 20 may be connected to the data management unit 100, and store a computing resource such as hardware, software, etc. The communication network 20 may include a closed network such as a local area network (LAN), a wide area network (WAN), etc. and an open network such as the Internet, and also may mean a broad concept including a network such as code division multiple access (CDMA), wideband code division multiple access (WCDMA), global system for mobile communications (GSM), long term evolution (LTE), evolved packet core (EPC), etc., a next generation network which will be implemented henceforth, and a computing network.

The data management unit 100 may store purchase information of a plurality of customers through the communication network 20.

For example, the data management unit 100 may be used as a server of an on-line market. The data management unit 100 may store various data related to products that the customer has previously purchased, or may have an interest in, in the on-line market. When the server of the on-line market is used as the data management unit 100, the data management unit 100 may store various original data such as basic information, a purchase product, a product contained in a wish list, a product contained in a shopping cart, a purchase pattern, a purchase location, a purchase amount, or another appropriate type of information associated with a customer. As such, the data management unit 100 may be a storage area for storing the original data for providing customer recommendation products.

Meanwhile, the product recommendation unit 200 may provide the customer recommendation product (or recommended products) having a high hit rate to the customer using data transmitted from the data management unit 100. At this time, the product recommendation unit 200 may select the customer recommendation product after selectively collecting only desired data from the data management unit 100. That is, the product recommendation unit 200 may not analyze all data stored in the data management unit 100, but may analyze only selected data by the selective collection. Accordingly, an amount of time required for selecting the customer recommendation products may be reduced by reducing the amount of unnecessary data.

For example, the product recommendation unit 200 may receive the purchase information of the customer with respect to each category. That is, only a category of products to be recommended to the customer among various categories such as groceries, furniture, digital devices, home appliances, computers, or the like may be selectively provided.

A distributed processing system for effectively managing big data may be applied to the product recommendation unit 200. The distributed processing system may be a system in which a plurality of processors operates to assist each other in parallel and asynchronously to improve processing capacity or efficiency, may not perform an operation of intensively processing every data in one processor, and may perform an operation of dispersively processing data in the plurality of processors.

As such, the product recommendation unit 200 may include a first recommendation algorithm 210 and a hybrid recommendation algorithm 220, and may provide the customer recommendation product having a high hit rate to the customer. The first recommendation algorithm 210 may be a collaborative filtering (CF) algorithm, an association rule (AR) algorithm, a purchase pattern (PP) product recommendation algorithm, etc. At this time, the first recommendation algorithm 210 is not limited to the recommendation method described above, and various algorithms may be used. Moreover, the first recommendation algorithm 210 may be a single algorithm rather than using a plurality of algorithms in conjunction to generate the product recommendation. For example, a plurality of single recommendation algorithm may be used as will be descried in further detail hereinafter. Accordingly, the first recommendation algorithm 210 is referred to as a single recommendation algorithm 210.

There are a customer-based recommendation method and a product-based recommendation method in the CF algorithm of the single recommendation algorithm 210. The customer-based recommendation method may be a method of recommending a product based on products purchased by another customer having similar preference with a corresponding customer. The product-based recommendation method may be a method of recommending, based on one or more products which were previously purchased by a corresponding customer, another product associated with the previously purchased product.

The AR algorithm may be a method of recommending another product associated with one product that a customer previously purchased based on purchase history information of the customer. In this method, products may be scored based on association and a product may be recommended based on the scoring representing a high association.

The PP product recommendation algorithm may be a method of recommending a product which a customer is expected to purchase by calculating a product purchase cycle of a customer, and a method of recommending a product by totally considering an average purchase cycle, a recent purchase cycle, etc. of the customer.

In other words, the product recommendation unit 200 may obtain a first recommendation result 211 using the single recommendation algorithm 210, and calculate a hit rate of each single recommendation algorithm 210 by a first performance evaluation 215. At this time, the single recommendation algorithm 210 may select the first recommendation result 211 using two or more algorithms.

Further, the product recommendation unit 200 may obtain a second recommendation result 221 using the hybrid recommendation algorithm 220, and calculate a hit rate of the hybrid recommendation algorithm 220 by a second performance evaluation 225.

As such, a method of calculating the recommendation result and the hit rate using the single recommendation algorithm 210 and the hybrid recommendation algorithm 220 will be described in detail hereinafter.

Meanwhile, the recommendation provision unit 300 may provide the customer recommendation product selected by the product recommendation unit 200 to the customer. The recommendation provision unit 300 may be a display unit for visually displaying on a screen, and may be a speaker, etc. for outputting an audible sound. That is, the recommendation provision unit 300 may include various types of devices for providing to the customer the product recommendations.

The recommendation provision unit 300 may provide the customer recommendation products in the form of a list, or a graph, etc., and may provide the customer recommendation product in various forms. The recommendation provision unit 300 may provide for the customers connected to the on-line market, and may provide the customer recommendation product to the terminal 10 of the customer based on an expected purchase time of the customer regardless of the connection of the on-line market.

Figure 2:
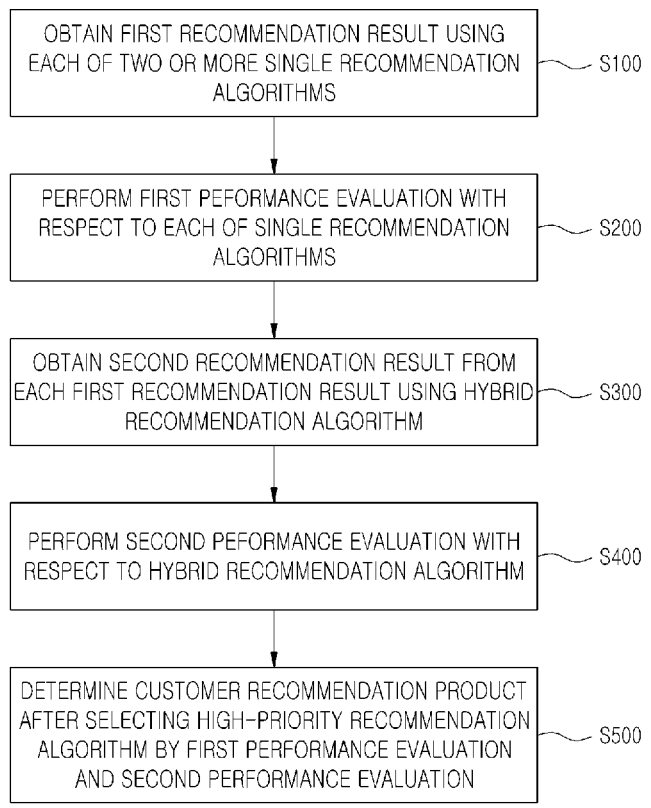
FIG. 2 is a flowchart for describing a personalized recommendation method according to an exemplary embodiment of the present disclosure.

FIG. 2 is a flowchart of a personalized recommendation method according to an exemplary embodiment of the present disclosure, FIG. 3 is a diagram illustrating a first recommendation result and a first verifying result obtained using a single recommendation algorithm according to an exemplary embodiment of the present disclosure, FIG. 4 is a diagram showing a second recommendation result obtained using a hybrid recommendation algorithm according to an exemplary embodiment of the present disclosure, and FIG. 5 is a diagram illustrating sales rate rankings according to an exemplary embodiment of the present disclosure.

Referring to FIGS. 2 to 5, the personalized recommendation method may select the customer recommendation product using the performance evaluation of the recommendation algorithm. The product recommendation unit 200 for selecting the customer recommendation product may include the single recommendation algorithm 210 and the hybrid recommendation algorithm 220, and select a product having a high hit rate as the customer recommendation product.

Particularly, according to the personalized recommendation method, first, an administrator may select two or more single recommendation algorithms 210 and the hybrid recommendation algorithm 220. At this time, the administrator may select two or more algorithms among various single recommendation algorithms 210. As described above, the single recommendation algorithm 210 may be the CF algorithm, the AR algorithm, the PP product recommendation algorithm, etc., and various algorithms may be used.

Next, the first recommendation result 211 with respect to each single recommendation algorithm 210 may be obtained by performing an algorithm with respect to a selected single recommendation algorithm 210 excluding the hybrid recommendation algorithm 220, in step S100.

At this time, the single recommendation algorithm 210 may perform an algorithm after classifying data provided from the data management unit 100 as first learning data and first verifying data. Here, the first learning data and the first verifying data may be classified by a data rate, or a period, and may be classified in various ways. For example, when the first learning data and the first verifying data are classified by a data ratio, the learning data and the verifying data may be classified to have the data ratio of 8:2. Further, when the first learning data and the first verifying data are classified by the period, the first learning data and the first verifying data may be classified to have data during 10 months and data during 2 months, respectively, with respect to data during one year. The data ratio and the period of the first learning data and the first verifying data are not limited to the method described above, and the first learning data and the first verifying data may be classified in various ways.

As such, the classified first learning data and first verifying data may be used for obtaining the first recommendation result 211 and a first verifying result 212 with respect to each single recommendation algorithm 210.

Referring to FIG. 3, the first recommendation result 211 and the first verifying result 212 obtained using the selected single recommendation algorithm 210 are illustrated. Three algorithms of the CF algorithm, the AR algorithm, and the PP product recommendation algorithm may be selected as the single recommendation algorithm 210. That is, FIG. 3(a) is the first recommendation result 211 and the first verifying result 212 showing the first recommendation product and a first recommendation ranking of each customer obtained using the CF algorithm. Here, the first recommendation result 211 may be a data result with respect to the first learning data, and the first verifying result 212 may be a data result with respect to the first verifying data.

The first recommendation result 211 and the first verifying result 212 with respect to each of the AR algorithm and the PP product recommendation algorithm may be obtained using the method described above.

Next, the first performance evaluation 215 may be performed using the first recommendation result 211 and the first verifying result 212 obtained using each single recommendation algorithm 210. At this time, the first performance evaluation 215 may be obtained by the following Equation for calculating a hit rate, in step S200:

$$\text{Hit rate } (\%)=\{M1\div(N1\times P1)\}\times 100 \qquad \text{Equation (1)}$$

where M1 is a number that the first verifying results and the first recommendation results are matched, N1 is a number of customers, and P1 is a number of recommendation products.

Referring to FIG. 3(a), when calculating the first performance evaluation 215 with respect to the CF algorithm, the number that the first verifying results and the first recommendation results are matched is 2 (i.e., common matched products is E and B), the number of customers is 1 person, and the number of recommendation products is 5. That is, the first performance evaluation 215 with respect to the CF algorithm obtained by applying 2, 1, and 5 to M1, N1, and P1, respectively, to Equation (1) results in a hit rate of 40%.

Referring FIG. 3(b), when calculating the first performance evaluation 215 with respect to the AR algorithm, the first performance evaluation 215 with respect to the AR algorithm obtained by applying 1, 1, and 5 to M1, N1, and P1, respectively, to the Equation (1) results in a hit rate of 20%.

Referring to FIG. 3(c), when calculating the first performance evaluation 215 with respect to the PP product recommendation algorithm, the first performance evaluation 215 with respect to the PP product recommendation algorithm obtained by applying 3, 1, and 5 to M1, N1, and P1, respectively, to the Equation (1) results in a hit rate of 60%.

Here, the number that that the first verifying result 212 and the first recommendation result 211 are matched may be calculated to match only when the same recommendation products of the same recommendation ranking are matched. However, when the two rankings of the same product are ranked within a prescribed amount from each other (e.g., within 1 position higher or lower), the number for matched results may be set as 0.5 for that product. Also, the number that the first verifying result 212 and the first recommendation result 211 are matched may differ according to an initial set value set by the administrator.

Next, the hybrid recommendation algorithm 220 may obtain the second recommendation result 221 from the first recommendation result 211 obtained by each of the single recommendation algorithm 210, in step S300.

Referring to FIG. 4, when selecting the second recommendation result 221, first, the accumulative recommendation number of recommendation products corresponding to the first ranking (top ranked) in the first recommendation ranking of each single recommendation algorithm may be compared. That is, a first ranked product of the CF algorithm may be A, a first ranked product of the AR algorithm may be B, and a first ranked product of the PP product recommendation algorithm may be C. Accordingly, each of the products A, B, and C corresponding to the first ranking in the first recommendation ranking has the same accumulative recommendation number of 1, and a product to be ranked first in the second recommendation result 221 may not be selected using only the products corresponding to the first ranking in the first recommendation ranking. However, when there is only one product having the greatest accumulative recommendation number among the products corresponding to the first ranking in the first recommendation ranking, that product may be selected as the first ranked product in the second recommendation result 221.

Returning to the example of FIG. 4, each of the first ranked products in the first recommendation ranking may have the same accumulative recommendation number of 1. In this case, the product to be ranked first in the second recommendation result 221 may be selected by comparing the accumulative recommendation number of the products corresponding to either the first ranked or the second ranked in the first recommendation ranking of the single recommendation algorithm.

Referring to FIG. 4 again, products A, B, C, D, and E corresponding to either the first ranked or the second ranked in the first recommendation ranking have the accumulative recommendation number of 1, 1, 1, 2, and 1, respectively, and the accumulative recommendation number of the product D is the greatest. Accordingly, product D may be selected as a first ranking product in the second recommendation result 221.

As such, when the first ranking product of the second recommendation result 221 is selected, a product to be ranked second in the second recommendation result 221 may be selected using the accumulative recommendation number of each of the products corresponding to the first to third ranks in the first recommendation ranking. At this time, the first ranked product in the second recommendation result 221 (e.g., product D in this example) may be excluded from the accumulative recommendation number.

Since the calculated products (the accumulative recommendation number) are A (2), B (1), C (2), E (1), and W (1), a single product having the greatest accumulative recommendation number cannot be selected. That is, the products A (2) and C (2) have a greater accumulative recommendation number than other products, but is not the only product having the greatest accumulative recommendation number. Accordingly, a product to be ranked second in the second recommendation result 221 is not selected using the first to third rankings of the first recommendation ranking. At this time, as previously noted, since the accumulative recommendation number of the product D is 2 but the product D is a first ranking product of the second recommendation result 221, the product D is excluded from products of the second and another rankings.

Next, a product to be ranked second in the second recommendation result 221 may be selected using the accumulative recommendation number of each of products corresponding to the first to fourth ranks in the first recommendation ranking.

The calculated products (the accumulative recommendation number) corresponding to the first to fourth rankings of the first recommendation ranking are A (2), B (2), C (2), E (3), and W (1), and only one product E has the greatest accumulative recommendation number. Hence, product E is assigned the second ranking in the second recommendation result 221.

Next, after selecting the product of the second ranking of the second recommendation result 221, a product to be ranked third and a product to be ranked fourth, etc. are sequentially selected according to the accumulative recommendation number of each of products corresponding to the first to fourth rankings of the first recommendation ranking.

However, since the result of the accumulative recommendation number excluding the product E selected as the product ranked second in the second recommendation result 221 based on the first to fourth rankings in the first recommendation ranking shows the same accumulative recommendation number as A (2), B (2), and C (2), the product of the third ranking and the product of the fourth ranking, etc. of the second recommendation result 221 cannot be selected using only the accumulative recommendation number.

Accordingly, the products A (2), B (2), C (2) having the greatest accumulative recommendation number excluding the products of the first and second rankings of the second recommendation result 221 are sequentially selected as the second recommendation product according to sales rate rankings.

Referring to FIG. 5, the products A, B, and C having the greatest accumulative recommendation number excluding the products of the first and second rankings of the second recommendation result 221 (e.g., products D and E) show a sales rate of 17.6% as a second sales rate ranking, a sales rate of 8.8% as a fifth sales rate ranking, and a sales rate of 11.4% as a fourth sales rate ranking, respectively. Accordingly, the products A, B, and C, which had the same accumulative recommendation number, are selected as products ranked third, fifth, and fourth in the second recommendation result 221, respectively, based on their respective sales rate rankings.

As such, the second recommendation products of the second recommendation ranking are the products D, E, A, C, B according to the second recommendation result 221 selected using the hybrid recommendation algorithm 220.

Here, the second recommendation result 221 selected using the hybrid recommendation algorithm 220 may not apply the sales rate ranking but be obtained using only the accumulative recommendation number, and the recommendation products to a specific ranking of the second recommendation result 221 may be selected using the accumulative recommendation number and remaining recommendation products may be selected according to the sales rate ranking. That is, the products up to the second or third ranking of the second recommendation result 221 may be selected using the accumulative recommendation number, and remaining recommendation products may be selected as the second recommendation result 221 according to the sales rate ranking, etc. Further, a method of obtaining the second recommendation result 221 selected using the hybrid recommendation algorithm 220 may be variably adjusted.

Meanwhile, the hybrid recommendation algorithm 220 may select a second verifying result 222 from the first verifying result 212. At this time, the second verifying result 222 may be obtained using the same method as the second recommendation result 221 of the hybrid recommendation algorithm 220. Hence, a detailed description with respect to the method of obtaining the second verifying result 222 will be omitted. At this time, the second verifying result 222 may not apply the sales rate ranking, but may be obtained using only the accumulative recommendation number.

As such, the second performance evaluation 225 may be performed on the second recommendation result 221 and the second verifying result 222 obtained using the hybrid recommendation algorithm 220. Here, the second performance evaluation 225 may be obtained using Equation (1) for calculating the hit rate as previously described with respect to the first performance evaluation 215, and a detailed method of calculating the second performance evaluation 225, in step S400, will be omitted for convenience.

FIG. 6 is a diagram illustrating a method of selecting a customer recommendation product according to an exemplary embodiment of the present disclosure, and FIG. 7 is a table illustrating a result of a customer recommendation product according to an exemplary embodiment of the present disclosure. The customer recommendation products may be selected from the first recommendation result 211, the first verifying result 212, the second recommendation result 221, and the second verifying result 222 obtained using the single recommendation algorithm 210 and the hybrid recommendation algorithm 220.

A priority of the customer recommendation products may be determined based on the performance evaluation of the recommendation algorithm, and after this, a customer recommendation product list may be sequentially listed from the recommendation result of a high-priority recommendation algorithm to the recommendation result of a low-priority recommendation algorithm. At this time, the high-priority recommendation algorithm may be a recommendation algorithm having the high hit rate by the performance evaluation, in step S500.

FIG. 6(*a*) shows a priority according to the performance evaluation of each of the single recommendation algorithms 210 and the hybrid recommendation algorithm 220, and shows that the priority is determined in the sequence of the hybrid recommendation algorithm 220, the PP product recommendation algorithm, the CF algorithm, and the AR algorithm.

FIG. 6(*b*) shows a list which is sequentially listed from the recommendation result of a high-priority recommendation algorithm to the recommendation result of a low-priority recommendation algorithm. As such, first, the customer recommendation products may be listed based on the priority, and second, the customer recommendation products may be listed according to the recommendation ranking of the recommendation algorithm.

The customer recommendation product listed by the personalized recommendation method may be listed by excluding the product which is in a lower priority when there is the same customer recommendation product in a higher priority as shown in FIG. 6(*c*).

FIG. 7 is a table showing a result of customer recommendation products selected by the method above described, and the customer recommendation products are recommended in the sequence of the products D, E, A, C, B, W, S, and F.

Effects of the personalized recommendation method and system, and the computer-readable record medium described above will be described below.

According to the present disclosure, since the customer recommendation products are determined using the first recommendation result and the second recommendation result obtained using two or more single recommendation algorithms and the hybrid recommendation algorithm, and the performance evaluation, the hit rate of the recommendation products is high. That is, the priority of the customer recommendation products is determined using the performance evaluation with respect to the first recommendation result and the second recommendation result, and a list of the customer recommendation products which are sequentially listed from the recommendation result of the high-priority algorithm to the recommendation result of the low-priority algorithm according to the result of the performance evaluation is provided. Accordingly, the hit rate of the recommendation products is high.

According to the present disclosure, the administrator selectively adjusts the single recommendation algorithms according to the category and the characteristic of the recommendation product. Accordingly, the hit rate of the recommendation products is high.

As broadly described and embodied herein, provided is a personalized recommendation method, system, and computer-readable record medium capable of recommending a product for each customer by considering characteristics of each customer.

According to one aspect of the present disclosure, there is provided a personalized recommendation method, which may include obtaining a first recommendation result using each of two or more single recommendation algorithms; performing a first performance evaluation with respect to each of the single recommendation algorithms; obtaining a second recommendation result from the first recommendation result of each of the two or more single recommendation algorithms using a hybrid recommendation algorithm; performing a second performance evaluation with respect to the hybrid recommendation algorithm; and listing customer recommendation products after selecting a recommendation algorithm having a priority using the first performance evaluation and the second performance evaluation.

According to an embodiment, the single recommendation algorithms may obtain the first recommendation result from first learning data, and obtain a first verifying result from first verifying data.

According to an embodiment, the first learning data and the first verifying data may be classified by a data ratio or a period.

According to an embodiment, the first performance evaluation may be performed by the following Equation of calculating a hit rate of each of the first recommendation result and the first verifying result.

According to an embodiment, the hybrid recommendation algorithm may obtain a second verifying result from the first verifying result.

According to an embodiment, the second performance evaluation may be performed using the calculated hit rate of each of the second recommendation result and the second verifying result.

According to an embodiment, the single recommendation algorithms may be at least one of a collaborative filtering (CF) algorithm, an association rule (AR) algorithm, and a purchase pattern (PP) product recommendation algorithm.

According to an embodiment, the obtaining of the second recommendation result using the hybrid recommendation algorithm, may include: collecting the first recommendation result obtained from each of the two or more single recommendation algorithms; selecting a first ranking product of second recommendation products by comparing the accumulative recommendation number of first recommendation products corresponding to a first ranking of the first recommendation ranking of each customer with respect to the collected first recommendation result; and selecting a product of a second ranking of the second recommendation products by comparing the accumulative recommendation number of the first recommendation products corresponding to the first and the second rankings of the first recommendation ranking of each customer excluding the first ranking product of the second recommendation products, and wherein, when the first recommendation products corresponding to the first ranking of the first recommendation ranking have the same accumulative recommendation number, a product of the first ranking and a product of the second ranking of the second recommendation products may be sequentially selected based on a product having a greater accumulative recommendation number by sequentially adding a product corresponding to a next ranking of the first recommendation products.

According to an embodiment, the personalized recommendation method may further include: determining a sequential product ranking of the second recommendation products by comparing the accumulative recommendation number of the first recommendation products excluding the first ranking product and the second ranking product of the second recommendation products, after the second ranking product of the second recommendation products is selected.

According to an embodiment, the personalized recommendation method may further include: determining a sequential product ranking of the second recommendation products according to a sales rate ranking when the first recommendation products have the same accumulative recommendation number after the second ranking product of the second recommendation products is selected.

According to an embodiment, the customer recommendation products may be sequentially listed from the recommendation result of a high-priority recommendation algorithm to the recommendation result of a low-priority recommendation algorithm.

According to another aspect of the present disclosure, there is provided a personalized recommendation system, including: a data management unit configured to store purchase history information of a customer; a product recommendation unit configured to determine a customer recommendation product using data provided from the data management unit; and a recommendation provision unit configured to provide the customer recommendation product determined by the product recommendation unit to the customer.

According to an embodiment, the recommendation provision unit may provide the customer recommendation product to customers connected to the data management unit, or to a terminal of the customer regardless of connection of the data management unit.

According to an embodiment, the product recommendation unit may receive the purchase information of each category from the data management unit.

According to still another aspect of the present disclosure, there is provided a computer-readable record medium for recording a computer program for executing a personalized recommendation method.

Exemplary embodiments described above may be recorded in a computer-readable record medium by being implemented in the form of program instructions which is executable using various computer components. The computer-readable record medium may include program instructions, data files, data structures, etc., alone or in combination. The program instructions recorded in the computer-readable record medium may be specially designed for the present disclosure, or may be known to those skilled in the art of the computer software field. Examples of the computer-readable record medium may include a hardware device, which is specially configured to store and execute the program instructions, such as a magnetic medium such as a hard disk, a floppy disk, and a magnetic tape, an optical storage medium such as a compact disc-read only memory (CD-ROM) and a digital video disc (DVD), a magneto-optical medium such as a floptical disk, a ROM, a random access memory (RAM), a flash memory, etc. Examples of the program instructions may include mechanical codes which are made by a compiler, and high-level language codes which are executable by a computer using an interpreter, etc. The hardware device may be configured to operate as one or more software modules to perform the method according to the present disclosure, and vice versa.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of providing a personalized recommendation of products, comprising:

transmitting, from a terminal used by a customer, data regarding the customer;

receiving, via a communication network and at a data management unit, the data transmitted from the terminal;

storing, at the data management unit, purchase information associated with at least the customer;

in response to receiving the data regarding the customer at the data management unit, providing at least part of the stored purchase information to a product recommendation unit that includes a computer processor;

classifying, at the computer processor based on the part of the stored purchase information provided to the product recommendation unit, data related to products into first learning data and first verifying data, the first learning data and the first verifying data being classified based on a data ratio or a period of time and at least one of the first learning data or the first verifying data being a subset of the data related to products, wherein the first learning data and the first verifying data are used by a first recommendation process and a second recommendation process, wherein the first recommendation process is a first one of a collaborative filtering (CF) algorithm, an association rule (AR) algorithm, or a purchase pattern (PP) product recommendation algorithm, and the second recommendation process is a second one, different than the first one, of the collaborative filtering (CF) algorithm, the association (AR) algorithm, or the purchase pattern (PP) product recommendation algorithm;

generating, at the computer processor and based on the first learning data and using the first recommendation process, a first recommendation result for a customer, the first recommendation result including a plurality of first recommendation result data for the customer, each of the plurality of first recommendation result data including a corresponding product with an associated ranking;

generating, at the computer processor and based on the first learning data and using the second recommendation process, a second recommendation result for the customer, the second recommendation result including a plurality of second recommendation result data for the customer, each of the plurality of second recommendation result data including a corresponding product with an associated ranking;

generating, at the computer processor and based on the first verifying data and using the first recommendation process, a first verifying result for the customer, the first verifying result including a plurality of first verifying result data for the customer, each of the plurality of first verifying result data including a corresponding product with an associated ranking;

generating, at the computer processor and based on the first verifying data and using the second recommendation process, a second verifying result for the customer, the second verifying result including a plurality of second verifying result data for the customer, each of the plurality of second verifying result data including a corresponding product with an associated ranking;

performing, at the computer processor, first performance evaluation including:
  comparing the plurality of first recommendation result data of the first recommendation result for the first recommendation process vis-à-vis the first verifying result data of the first verifying result for the first recommendation process to determine match occurrences, and the match occurrences occur when a specific product has a same ranking in the first recommendation result data as in the first verifying results data,
  comparing the plurality of second recommendation result data of the second recommendation result for the second recommendation process vis-à-vis the second verifying data result of the second verifying result for the second recommendation process to determine further match occurrences, and the further match occurrences occur when a specific product has a same ranking in the second recommendation result data as in the second verifying result data, performing, at the computer processor, a hybrid recommendation process, to generate a hybrid recommendation result, based collectively on:
  the plurality of first recommendation result data of the first recommendation result for the first recommendation process, and
  the plurality of second recommendation result data of the second recommendation result for the second recommendation process,
  the performing of the hybrid recommendation process including determining a product having a highest accumulative recommendation number, and the highest accumulative recommendation number constituted by collective rankings, associated with each product, across both the plurality of first recommendation result data and the plurality of second recommendation result data;

performing, at the computer processor, second performance evaluation with respect to the hybrid-recommendation result from the hybrid recommendation process;

assigning, at the computer processor, a different priority to each of the first recommendation process, the second recommendation process, and the hybrid recommendation process based on the first performance evaluation and the second performance evaluation; and listing product recommendations, at the product recommendation unit, in a specific order based on:
  (1) the assigned different priority of the first recommendation process, the second recommendation process, and the hybrid recommendation process, and
  (2) for each separate recommendation process, the product recommendations are sequentially listed according to a corresponding generated recommendation result;

removing, at the product recommendation unit and from the listing of product recommendations, information of a first product having a lower priority, of the different priorities, when the same first product having a higher priority is provided in the listing; and transmitting, from the product recommendation unit to the terminal, and displaying, at the terminal, from the listing of product recommendations, remaining product recommendations including information of the first product having the higher priority after the removal of the information of the first product having the lower priority of the assigned different priorities, wherein the first performance evaluation is performed by the computer processor according to a prescribed equation for calculating a hit rate among the plurality of first recommendation result data and the first verifying result data for the first recommendation process and for calculating a hit rate among the plurality of second recommendation result data and the second verifying result data for the second recommendation process, where the hit rate is determined based on a number of products having the match occurrences, a number of customers, and a number of recommended products.

2. The method of claim 1, wherein the first recommendation process includes obtaining the plurality of first recommendation result data from the first learning data, and obtaining the plurality of first verifying result data from the first verifying data.

3. The method of claim 2, wherein the first learning data and the first verifying data are classified by a ratio of an amount of data or a time period.

4. The method of claim 2, where $$\text{Hit rate }(\%) = \{M1 \div (N1 \times P1)\} \times 100$$

Where M1 is the number of products having the match occurrences, N1 is the number of customers, and P1 is the number of recommended products.

5. The method of claim 1, further including providing:
the computer processor;
the data management unit that stores the purchase information of the customer;
the product recommendation unit that includes the computer processor that determines remaining product recommendations for the customer using data provided from the data management unit; and a communication interface that outputs the remaining product recommendations determined by the product recommendation unit to the terminal of the customer.

6. The method of claim 5, wherein the communication interface provides the remaining product recommendations to customers based on an expected purchase time of products.

7. The method of claim 5, wherein the product recommendation unit receives purchase information from a plurality of categories of products from the data management unit.

* * * * *